United States Patent Office  2,916,387
Patented Dec. 8, 1959

2,916,387

GLASS COLORANT COMPOSITION

Charles H. Commons, Jr., Willistown Township, Chester County, Pa., assignor to Foote Mineral Company, Berwyn, Pa., a corporation of Pennsylvania No Drawing. Application March 7, 1958
Serial No. 719,732

12 Claims. (Cl. 106—47)

This invention relates to the manufacture of colored glass; and more particularly provides novel color concentrate compositions and a novel method of producing colored glass employing the said composition.

In the glass industry, colored glass is produced in large volume, especially for the manufacture of containers such as bottles for soft drinks and other beverages. The production of colored glass poses problems of particular difficulty. The glass melt, in manufacture on any large scale, is fused by radiant heating: the ingredients, consisting essentially of sand limestone and soda ash, are melted down in tanks in which heat is supplied by flames played on the surface of the mass. The efficiency of such a heating method is reduced to a substantial degree when a melt of colored glass is so prepared, since the presence of the coloring matter prevents transmission of the radiant heat below the surface, and significantly decreases heat transfer. Accordingly, the manufacture of colored glass is wasteful of fuel and expensive.

Additionally, difficulties are encountered in the manufacture of colored glass when it is desired to produce differently colored or colored and clear glass alternatively in the same tank. It is usual practice for the same tank to be used for a run of glass of one color, the run being continued for a number of months, and then for the production of glass which is clear or of another color. The melting tanks are quite large, containing about 200 tons of glass, and when such a change in the color of the product is made, it may require as much as a week's operation before all traces of the previous color have been flushed from the tank. This tedious and wasteful interim conversion period in which off-grade and less valuable product is obtained thus also increases the cost of the manufacture of colored glass.

It would accordingly be highly desirable to conduct operations in the glass industry in such manner that the melting tank is limited to the production of clear glass, and when colored glass is required, that the coloring matter be introduced at a point exterior to the tank. A procedure for operation in this manner has been proposed in the prior art but has not achieved adoption in the industry because of certain deficiencies.

The method which has been previously proposed for avoiding the disadvantages of preparing colored glass in the melting tank comprised the coloring of glass by addition of a solution of coloring matter in molten glass to the pool of glass in a fore-hearth.

The fore-hearths are external containers, positioned about the melting tank, beyond the fining area, into which the liquid glass is drawn off. From the pools in the fore-hearths, the glass is taken off in controlled amounts by a feeder, and conveyed to the forming machinery for shaping and finishing.

The stated prior art proposal provided a device to be interposed between the tank and the feeder, whereby a molten glass solution of the colorant was mixed with the flowing glass while the glass was stirred and heated, producing a homogeneous product.

The requirement for use of a molten glass solution of the colorant has prevented the adoption of this method in commercial practice. Glass is molten only at about 2200–2900° F. and to maintain this temperature requires a very high heat input. The problems involved in maintaining the colorant container at the necessary temperature are further complicated by the fact that glass has only a limited solubility for the metal oxides used as colorants therefor, and consequently relatively large volumes of colorant solution would have to be handled.

It would be very much preferable if the coloration of the molten clear glass could be accomplished by the use of of a colorant additive which is solid.

Direct addition of a colorant material such as a colorant metal oxide to the glass in the pool is ineffective, because the oxide does not liquefy or dissolve sufficiently rapidly to produce a uniform mixture in the time and space available. A colorant is required which will be fluid enough to mix easily and quickly.

Compositions comprising a solid glass solution of a colorant, on the other hand, are generally insufficiently concentrated to be effective.

For use in commercial practice, it is necessary that the colorant material be sufficiently concentrated so that only a relatively small volume need be added to the molten glass to attain the requisite depth of coloration. Introduction of a large volume of a solid substance will produce a disadvantageous decrease in the tempertature of the molten glass. For proper operation of the forming machinery, the molten glass must be maintained within relatively narrow temperature limits. The heat sources provided to maintain the glass temperature in the fore hearths, however, are of limited capacity. If substantial amounts of a solid substance such as a colorant composition are introduced into the glass in the fore-hearth, these heat sources are insufficient to compensate for the consequent drop in temperature. The forming machinery then fails to operate properly.

Glass generally has an extremely low solubility for the color metal oxides. The characteristic of low solubility in glass is especially true of the chromium oxides used to produce the commercially important class of green glass. As is well known, green is one of the most frequently used colors for beverage bottles, in shades ranging into quite deep tones, and accordingly, particular attention has been directed to coloration of glass with chromium. The limit of solubility of chromia in glass, as a solid, is only about 1¼% to 1½%; thus, to use a composition comprising a solution of chromia in glass as a source of this color oxide requires the introduction of almost 100 parts by weight of colorant composition per part of the chromium oxide. So large a volume of the solid chromia-containing composition must therefore be introduced to produce the required depth of coloration in the molten glass, that the addition of the solid produces a decided drop in the temperature of the mass, and the glass becomes too viscous for proper functioning of the glass forming machinery.

To overcome the problem of temperature lowering by the addition of the colorant, a solid composition containing at least about 5% color oxide is required. A concentration of at least 10% would be more desirable to minimize the temperature drop produced by addition thereof to the molten glass.

Furthermore, such solid composition, besides being sufficiently fluid to mix rapidly and uniformly in the limited time and space available in the glass drawing areas, must also be stable, i.e. must not produce insoluble crystals upon addition to the molten glass. Solid glass solutions of chromia can be prepared which contain higher concentrations of chromia than are normally available, if the molten solution is cooled very rapidly to room temperature. However, the resulting supersaturated solid compositions are unstable, and during the relatively gradual heating which occurs when the solid is added to the molten glass, the chromia in excess of that normally soluble in the solid glass is thrown out of the solution, forming crystals which dissolve only slowly or not at all.

It is an object of this invention to provide improved compositions and methods for the manufacture of colored glass.

It is a particular object of this invention to provide a stable glass colorant composition containing such a high proportion of chromia colorant as to allow production of the desired coloration by addition of said composition to molten clear glass in a sufficiently small quantity to produce a negligible temperature-reducing effect on the molten glass, said composition being characterized by rapid melting and fluidity such as to produce rapid, easy and uniform mixing and solution, without producing insoluble chromia crystals.

Another particular object of this invention is to provide a method for coloring glass at a point exterior to the glass melting tank, by the addition to molten clear glass of a solid colorant composition which contains a sufficiently high proportion of color oxide to produce the desired coloration when added in a quantity having a negligible temperature-reducing effect on the molten glass, and yet which is fluid enough to mix easily and uniformly in the small time and space available in glass drawing areas.

An additional object of this invention is to produce a glass color concentrate composition having a substantial chromia content and adapted for the production of green-colored glass.

Another object is to produce a glass colorant composition comprising chromium and iron color oxides, characterized by excellent stability, a relatively low melting point, and high coloring power.

Another object is to produce a novel and improved method for the incorporation of color oxides into glass.

An additional object is to provide an improved method for the production of colored glass, especially green-colored glass.

A further object is to provide a method for the production of colored glass by the addition of relatively small amounts of a stable, solid color concentrate to the glass at a point exterior to the glass melting tank.

I have now found that a solid color concentrate containing a high proportion of chromia in stable solution therein and adapted for use in solid form as a glass colorant composition can be prepared by combining color metal oxide comprising chromia with an alkali metal oxide and phosphorus pentoxide.

By addition of a relatively small amount of such composition to molten clear glass, the coloration of glass at a point exterior to the glass melting tank is advantageously accomplished.

Because of the high concentrations of color oxide available when such color concentrates are employed, it is possible to add these colorants in sufficiently small amounts as to produce the desired depth of coloration with only a negligible effect on the temperature of the molten glass mass. The stated glass color concentrate compositions rapidly liquefy in the neighborhood of 2200–2300° F. to produce even and uniform dispersion of the color oxide throughout the molten glass to form a solution in a short space of time. The components enter into the silicate glass network, in the small quantities employed, exerting a negligible, or potentially beneficial, effect on the properties thereof and readily being absorbed into the mass. Thus, by the present procedure an advantageous method for the coloration of glass is provided whereby coloration thereof with a solid color concentrate composition is made feasible for practical application.

The ingredient present in highest amount, individually, in the color concentrate compositions of this invention will be phosphoric pentoxide. In order to attain high concentrations of color oxide in stable solution in the presently provided compositions, it has been found that the composition must contain a substantial proportion of this component. As calculated with respect to the total color concentrate composition, $P_2O_5$ will comprise at least about 45% and up to about 75%, by weight.

The color concentrate composition will also contain a minor proportion of a water-insolubilizing component, such as alumina, beryllia and combinations of one or more of these with an alkaline earth metal oxide such as CaO, BaO, SrO, MgO, or the like, so that during fritting and subsequent drying the composition will not dissolve or hydrate. The amount of water-insolubilizing component will be such as to render the composition substantially insoluble in water. For this purpose as little as about 1%, by weight, of the water-insolubilizing component may be present, and amounts thereof may range up to about 15%. In general alumina will be the least expensive water-insolubilizing component and is the preferred material for use in the compositions of the present invention. Alumina in amounts between about 5% and about 12% is particularly advantageous.

As a flux for the $P_2O_5$, alkali metal oxides will make up about 5–15% of the color concentrate. The alkali metal oxides employed herein will be selected from the oxides of sodium, potassium, and lithium. A solid composition containing $Cr_2O_3$ in stable solution therein in a concentration substantially superior to that obtainable with silicate glass may be produced in accordance with this invention when the color concentrate comprises a single alkali metal oxide selected from oxides of Na, K and Li.

However, I have made the discovery that a substantially enhanced proportion of color metal oxide comprising $Cr_2O_3$ can be held in stable solution in the solid color concentrate composition when such composition contains at least two of the oxides of the aforesaid alkali metals. More particularly, I have found that when the color concentrate composition contains at least two of the oxides of the alkali metals Na, K and Li, and $Li_2O$ is present in an amount up to about 4% by weight of the total composition, the composition will hold a surprisingly high and highly advantageous amount of $Cr_2O_3$ in stable solution thereof.

Only relatively low proportions of lithium oxide are required in the color concentrate composition to produce enhanced solubility for chromia, and I find it unnecessary to introduce more than about 4% lithia for this purpose. The desired chromia-holding effect is evident even at substantially lower concentrations; for example, even at a 1.5% $Li_2O$ concentration, the color concentrate composition will form a solution containing over 10% $Cr_2O_3$. Lesser amounts of $Li_2O$ may be employed if desired, but in general concentrations of at least about 0.1% will be preferred to produce a substantial solubility-enhancing effect.

In addition to the foregoing substances and the color oxide as discussed hereinafter, the colorant composition may contain other ingredients, including both materials deliberately added to modify the properties of the composition, as well as substances fortuitously introduced by the sources of raw material used to prepare the composition.

As the colorant thereof, the color concentrate composition of this invention will contain color metal oxide comprising $Cr_2O_3$. Generally the present color concentrate compositions will comprise at least about 5% chromia, and the preferred $Cr_2O_3$ content will be in the range of from about 6%, preferably about 8%, to about 13%. The total color metal oxides may range up to as high as about 25% by weight of the total composition.

As stated above, in the novel color concentrates, the color metal oxide will comprise $Cr_2O_3$. Such compositions are designed for use in the manufacture of glasses in the green range, and $Cr_2O_3$ is the essential color oxide for production of this color. Additional color metal oxides, however, may and generally will be present. Thus, for example, a common source of chromia for use in producing colored glass is chromite ore, which is a material containing, in addition to chromia, substantial amounts of iron oxide. The iron also is a color-contributing material, which darkens the shade of the glass; it additionally improves the chemical durability of glass, and has other desirable properties. Besides, chromite ore is very much less expensive than the pure chromia. Accordingly it forms a preferred embodiment of this invention to employ chromite as the color metal oxide component of the presently provided color concentrate compositions. Thus for example, a composition of the preferred nature will contain 55–72% phosphorus pentoxide, 1–15% of the water-insolubilizing component, especially alumina, 5–15% of an alkali metal oxide consisting at least in part of lithium oxide and 5–25% of color oxides consisting of chromium oxide and iron oxide. When FeO is present, the weight-percent of FeO should not exceed the weight-percent of $Cr_2O_3$ to achieve a satisfactory green color.

Other combinations of chromia with color modifier oxides frequently used in the glass industry comprise chromium/copper and chromium/copper/iron oxide combinations. The copper oxide produces a bluish tinge to the green color which is sometimes desirable. These color oxide combinations are also contemplated within the context of this invention, in the form of color concentrate compositions as set forth above.

The most preferred embodiment of the color concentrate compositions provided by this invention will be a composition consisting essentially of

|  | Percent |
|---|---|
| $Na_2O$ | 11–15 |
| $Li_2O$ | 0.1–2 |
| $Al_2O_3$ | 2–12 |
| $P_2O_5$ | 55–72 |
| $Fe_2O_3$ | 3–7 |
| $Cr_2O_3$ | 6–13 |

The composition ranges and amounts referred to in the foregoing description are in terms of percent by weight and refer to the proportions of constituents in the frit.

The color concentrate composition in the form of a frit having the above-described chemical composition will be prepared in accordance with usual practice. As is known, in preparing a frit, compounds ultimately providing the desired oxide analysis are mixed together in fine particle size and melted. The molten mass is quickly cooled, as by water quenching, causing it to shatter into small particles, which are dried to provide the frit. Compounds which may be employed to provide the above chemical oxide analysis are well known in the art. Thus, the alkali metal oxides may be provided, for example, by carbonates, phosphates, nitrates, minerals and the like, such as sodium carbonate, sodium phosphate, borax, potassium carbonate, lithium carbonate, lithium phosphate, tribasic lithium phosphate, lithium nitrate and so forth. The $P_2O_5$ may be suplied by a source such as ammonium phosphate, metaphosphoric acid or the like. Alumina may be provided by a mineral supplying one or more of the constituents mentioned above. One compound may provide some or all of a plurality of the above-mentioned oxides; for example, amblygonite may provide lithium, aluminum, and phosphorus; sodium phosphate may provide both sodium oxide and phosphorus pentoxide, and so forth. In any event, the compounds will be selected in accordance with well known practice to provide the proper oxide analysis, and in the event such compounds contain a constituent not desired in the ultimate frit, such constituent will be of a volatile nature so that it will be removed during heating and melting of the mixture. For example, where carbonates are employed, carbon dioxide is liberated; and where ammonium compounds such as ammonium phosphate are employed, the ammonia is set free.

The materials in fine particle size providing the desired chemical analysis upon heating and melting thereof and mixed together and heated to an elevated temperature to provide a molten, pourable mass. With the compositions of the present invention, temperatures in the neighborhood of from about 2250° to about 2400° F. may be employed to provide the molten mass. The molten mass is then quickly cooled and chilled as by pouring it into a water bath and such quick chilling causes the glass-like mass to fracture into small pieces. The frit consisting of these small pieces is then recovered and dried.

The resulting frit may, if desired, be ground to reduce its size further so as to provide for more rapid melting.

The method of the invention is practiced by adding the solid color concentrate to the molten glass at a point exterior to the glass melting tank in such manner as to produce a homogeneous distribution thereof in the glass.

Generally, for the purposes of this invention, such glass will be a bottle glass. Glass used for the manufacture of bottles usually contains aluminum oxide in addition to silica and sodium and calcium oxides, and may contain small amounts of other oxides such as magnesium oxide.

Generally, the color concentrate containing color metal oxide will be added to the molten glass in finely-divided form, to promote rapid dispersion and dissolution thereof. Suitably the color concentrate will be employed in the form of a frit of small particle size.

The color concentrate may be added to molten glass at any desired point. Where advantageous, the method of this invention may be practiced as a batch process. Ordinarily, however, it will be most desirably carried out by addition of the glass color concentrate to the molten glass on a continuous basis. In glass manufacturing practice, the addition will most conveniently be made to the pool of glass in the fore-hearth, while the glass is in passage between the melting tank and the feeder.

Distribution of the solid color concentrate in the molten glass may be accomplished by any suitable means, as by introducing a stirring device into the pool of glass, or by adding the color concentrate at a controlled rate while the glass is being drawn and moved through a confined area such that flow and slip within the glass produces a homogeneous mixture. The locus and manner of mixing will readily be selected by those skilled in the art; and the particular method of addition chosen to produce a homogeneous glass will depend on the apparatus available, the selected point of addition, and the like. Considerable variation and modification as to the mode of practicing the invention is possible.

The amount of color concentrate to be added to the glass will be determined by the size of the molten glass pool, the concentration of the color oxide in the color concentration, the depth of color to be produced, and so forth. Enough color concentrate will be added to produce about a 0.02% concentration of $Cr_2O_3$ in the resulting glass, for a light green bottle; or up to about 0.2% $Cr_2O_3$ for an emerald green. The proportions to be employed with any selected set of factors can readily be determined by one skilled in the art.

The invention is illustrated but not limited by the following examples.

*Example I*

To produce a color concentrate having the following theoretical composition

|  | Percent |
|---|---|
| $Na_2O$ | 12.0 |
| $Li_2O$ | 1.5 |
| $Al_2O_3$ | 10.0 |

|  | Percent |
|---|---|
| $P_2O_5$ | 57.2 |
| $Fe_2O_3$ | 6.4 |
| $Cr_2O_3$ | 11.4 |
| MgO | 1.0 |
| F | 1.6 |
|  | 101.1 |

The batch melted may be of the composition:

| | |
|---|---|
| Chromite _____parts__ | 25.7 |
| Sodium tripolyphosphate _____do____ | 28.5 |
| Amblygonite _____do____ | 17.7 |
| Monoammonium phosphate ____parts by weight__ | 53.0 | or of the composition:

| | Parts |
|---|---|
| Chromite | 25.7 |
| Cryolite | 3.0 |
| Sodium tripolyphosphate | 25.3 |
| Aluminum metaphosphate | 28.7 |
| Lithium carbonate | 3.8 |
| Monoammonium phosphate | 31.4 |

In either case, the batch is melted together and held at a temperature of about 2300–2350° F. for a sufficiently long time to produce substantially complete removal of all volatile ingredients and homogeneous mixture of all the ingredients. The molten batch is a homogeneous single-phase fused mass which solidifies on cooling to form a green-black composition. The molten mass will be poured into cold water and the resulting particles further ground to produce a finely divided frit.

The frit prepared as described above is a powder, so deeply colored as to appear black on visual inspection except for very thin plates thereof. On addition to molten clear glass, the frit rapidly liquefies and spreads throughout the mass to provide a uniformly colored green glass. In the small quantities required to produce even a deep coloration of the glass, the solid colorant has a negligible effect on the temperature of the molten glass, and the glass after coloration is substantially unchanged in properties, and maintains the viscosity desirable for feeding to the forming and shaping machinery.

*Example II*

By the procedure described above, a batch consisting of

| | |
|---|---|
| Soda ash _____parts__ | 17 |
| Monoammonium phosphate _____do____ | 80 |
| Chromite _____parts by weight__ | 10 | is fused to produce a frit having the theoretical oxide composition

| | Percent |
|---|---|
| $Na_2O$ | 14.6 |
| $Al_2O_3$ | 2.0 |
| $P_2O_5$ | 71.9 |
| $Fe_2O_3$ | 3.7 |
| $Cr_2O_3$ | 6.5 |
| MgO | 0.6 |

This frit, having a $Cr_2O_3$ content of 6.5%, can also advantageously be used for the coloration of molten clear colorless glass.

While the invention has been described with reference to various particular preferred embodiments thereof, it will be appreciated that variations and modifications can be made within the scope of the appended claims.

What is claimed is:

1. As a new composition of matter, a deeply colored color concentrate composition, in the form of a frit, having an oxide analysis as follows: about 45–75% $P_2O_5$; about 1–15% of a water-insolubilizing constituent selected from the class consisting of aluminum oxide, beryllium oxide, and combinations of aluminum oxide and of beryllium oxide with an alkaline earth metal oxide selected from the group consisting of the oxides of calcium, barium, strontium and magnesium; about 5–15% of an alkali metal oxide selected from the class consisting of the oxides of sodium, potassium and lithium; and about 5–25% of color metal oxides comprising at least about 5% chromia, the selected percentages of said oxides together totalling substantially 100%.

2. The frit of claim 1 wherein lithium oxide is present in an amount up to about 4%.

3. The frit of claim 1 wherein said alkali metal oxide is sodium oxide.

4. The frit of claim 1 wherein said alkali metal oxide consists of lithium oxide and sodium oxide.

5. The color concentrate composition of claim 4 wherein said color metal oxides consist of chromia and iron oxide.

6. The color concentrate composition of claim 1 wherein said color metal oxides are selected from the class consisting of the oxides of chromium, copper and iron.

7. A color concentrate composition having an oxide analysis consisting essentially of

| | Percent |
|---|---|
| $Na_2O$ | 11–15 |
| $Li_2O$ | 0.1–2 |
| $Al_2O_3$ | 2–12 |
| $P_2O_5$ | 55–72 |
| $Fe_2O_3$ | 3–7 |
| $Cr_2O_3$ | 6–13 |

8. The method of coloring glass which comprises adding to molten glass a solid color concentrate composition in the form of a frit, having an oxide analysis as follows: about 45–75% $P_2O_5$; about 1–15% of a water-insolubilizing constituent selected from the class consisting of aluminum oxide, beryllium oxide, and combinations of aluminum oxide and of beryllium oxide with an alkaline earth metal oxide selected from the group consisting of the oxides of calcium, barium, strontium and magnesium; about 5–15% of an alkali metal oxide selected from the class consisting of the oxides of sodium, potassium and lithium; and about 5–25% of color metal oxides comprising at least about 5% chromia, the selected percentages of said oxides together totalling substantially 100%

9. The method of claim 8, wherein $Li_2O$ is present in said composition in an amount up to about 4% by weight, and $Na_2O$ is present in an amount composing the remainder of said oxides of the alkali metals.

10. The method of claim 9, wherein said composition contains above about 10% chromia.

11. The method of claim 10 wherein said color metal oxide consists of chromia and iron oxide.

12. The method of coloring glass which comprises adding to molten glass a composition in the form of a solid frit having an oxide analysis consisting essentially of

| | Percent |
|---|---|
| $Na_2O$ | 11–15 |
| $Li_2O$ | 0.1–2 |
| $Al_2O_3$ | 2–12 |
| $P_2O_5$ | 55–72 |
| $Fe_2O_3$ | 3–7 |
| $Cr_2O_3$ | 6–13 |

References Cited in the file of this patent

UNITED STATES PATENTS

| 1,830,903 | Hood | Nov. 10, 1931 |
|---|---|---|
| 2,378,769 | Hood | June 19, 1945 |

FOREIGN PATENTS

| 728,808 | Great Britain | Apr. 27, 1955 |
|---|---|---|